US012296612B2

(12) United States Patent
Chen

(10) Patent No.: US 12,296,612 B2
(45) Date of Patent: May 13, 2025

(54) 3D POP-UP CARD ASSEMBLY

(71) Applicant: JAST Gifts Shenzhen Company Limited, Shenzhen (CN)

(72) Inventor: Jen-Lin Chen, Cupertino, CA (US)

(73) Assignee: Jast Gifts Shenzhen Company Limited, Shenzhen (CN)

( * ) Notice: Subject to any disclaimer, the term of this patent is extended or adjusted under 35 U.S.C. 154(b) by 0 days.

(21) Appl. No.: 18/943,810

(22) Filed: Nov. 11, 2024

(65) Prior Publication Data

US 2025/0065664 A1 Feb. 27, 2025

Related U.S. Application Data

(63) Continuation-in-part of application No. 17/966,903, filed on Oct. 17, 2022, now Pat. No. 12,162,302.

(30) Foreign Application Priority Data

Jul. 15, 2022 (DE) ..................... 20 2022 103 988.7

(51) Int. Cl.
*B42D 15/04* (2006.01)
*B42D 15/02* (2006.01)

(52) U.S. Cl.
CPC ......... *B42D 15/045* (2013.01); *B42D 15/022* (2013.01)

(58) Field of Classification Search
CPC .. B42D 15/042; B42D 15/002; B42D 15/045; G09F 1/06
See application file for complete search history.

(56) References Cited

U.S. PATENT DOCUMENTS 10,500,887 B1 12/2019 Kelly
11,577,539 B1 * 2/2023 Chen .................... B42D 15/022
2005/0227214 A1 * 10/2005 Clegg .................. B42D 15/022
2010/0018091 A1 * 1/2010 Rosendale ........... B42D 15/047 40/442
2011/0258893 A1 * 10/2011 Mayer .................. B42D 15/022 40/124.03

(Continued)

FOREIGN PATENT DOCUMENTS

DE 202021104469 12/2021

OTHER PUBLICATIONS

Communication Pursuant to Article 94(3) EPC Dated May 16, 2024 From the European Patent Office Re. Application No. 2220094.5 (4 Pages).

(Continued)

*Primary Examiner* — Gary C Hoge
(74) *Attorney, Agent, or Firm* — LaMorte & Associates PC

(57) ABSTRACT

A 3D pop-up card assembly having a base card and a foldable figure that pops up when the base card is opened. The foldable figure is attached to the base card using a plurality of paper hinge constructs. Each of the paper hinge constructs has a first tab, a second tab and a transition section. The transition section contains fold lines along which each of the paper hinge constructs can fold. The first tab of each paper hinge construct is attached to the base card. The second tab of each paper hinge construct is attached to the foldable figure. When the base card is opened, each paper hinge construct can rotate in unaligned planes, therein applying tension to the foldable figure as the orientation between the base card and the foldable figure changes.

8 Claims, 7 Drawing Sheets

(56) References Cited

U.S. PATENT DOCUMENTS

| | | | | |
|---|---|---|---|---|
| 2016/0365010 | A1* | 12/2016 | Wise | B42D 15/042 |
| 2017/0267012 | A1 | 9/2017 | Krieman | |
| 2018/0102070 | A1* | 4/2018 | Yeh | G09F 1/08 |
| 2021/0005113 | A1* | 1/2021 | Wallen | B42D 15/042 |
| 2023/0053542 | A1* | 2/2023 | Chen | G09F 25/00 |
| 2024/0059093 | A1* | 2/2024 | Chen | B42D 15/022 |

OTHER PUBLICATIONS

Erweiterter Europaischer Pecherchenbericht [European Search Report] Dated Aug. 10, 2023 From the European Patent Office Re. Application No. 2220094.5 (6 Pages).

* cited by examiner

3D POP-UP CARD ASSEMBLY

RELATED APPLICATIONS

This application is a continuation-in-part of U.S. patent application Ser. No. 17/966,903 filed Oct. 17, 2022, which claims priority of German Patent Application No. 20 2022 103 988.7 filed on Jul. 15, 2022. A certified copy of the foreign application has been filed in parent application Ser. No. 17/966,903.

BACKGROUND OF THE INVENTION

1. Field Of The Invention

The present invention relates to 3D pop-up cards having a foldable base card with an inner side and an outer side. The base card is foldable along a fold and reversibly transferable from a folded closed state to an unfolded open state. A foldable figure is fixed to the inner side of the base card and the foldable figure unfolds autonomously to form a three-dimensional structure when the base card is transferred to an open state.

2. Prior Art Description

Three-dimensional pop-up cards, hereinafter also referred to as 3D cards, have been known for some time and come in a wide variety of designs. Such 3D cards essentially comprise a simply folded card as a base, hereinafter referred to as a base card, and a foldable figure arranged in the base card. The main function of such a 3D card is that an initially essentially two-dimensional compressed figure rises three-dimensionally from the card plane when the folded card is opened.

Typically, corresponding 3D cards can be opened from a closed state by unfolding the base card by 180° into a flat plane. The underlying mechanism is based on the fact that the compressed figure is attached to the base card in such a way that opening the folded base card applies a tensile stress to the figure, which unfolds the figure from the compressed two-dimensional state to the three-dimensional or expanded shape.

Thus, the construction of corresponding 3D cards requires the formation of a figure that can be transformed from a compressed two-dimensional state to a three-dimensional state, and also provides a means of fixing the figure inside the base card.

The task of the current invention is to provide a design that ensures easy fixation of the figure to the base card and easy unfolding of the figure when the 3D card is opened. This task is solved by providing a 3D pop-up card with a foldable base card which has an inner side and an outer side. The base card is foldable along a fold and reversibly transferable from a folded, closed state to an unfolded, open state. A foldable figure is fixed to the inner side of the base card wherein the foldable figure unfolds autonomously to form a three-dimensional structure when the base card is transferred to an open state. The base card has at least one position on each side of the fold, wherein the base card and the foldable figure are connected to each other via paper hinge constructs that are separate and distinct from both the base card and the foldable figure. Each paper hinge construct has a first tab that engages the card and a second tab that engages the foldable figure.

SUMMARY OF THE INVENTION

The present invention is a 3D pop-up card assembly where a foldable figure pops up from a base card when the base card is opened. The base card has a first panel and a second panel that are joined along a common folding joint. The foldable figure is a structure having a folded flat condition and an unfolded three-dimensional condition. The foldable figure is attached to the base card using a plurality of paper hinge constructs.

Each of the paper hinge constructs has a first tab, a second tab and a transition section that is interposed between the first tab and the second tab. The transition section contains fold lines along which each of the paper hinge constructs can fold. The first tab of each paper hinge construct is attached to the base card. The second tab of each paper hinge construct is attached to the foldable figure, therein connecting the foldable figure to the base card. When the base card is opened, each paper hinge construct can rotate in unaligned planes, therein applying tension to the foldable figure as the orientation between the base card and the foldable figure changes.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention pop-up card system and methodology can be embodied in many ways, only two exemplary embodiments are illustrated and described. The exemplary embodiments are being shown for the purposes of explanation and description. The exemplary embodiments are selected in order to set forth some of the best modes contemplated for the invention. The illustrated embodiments, however, are merely exemplary and should not be considered as limitations when interpreting the scope of the appended claims.

Figure 1:
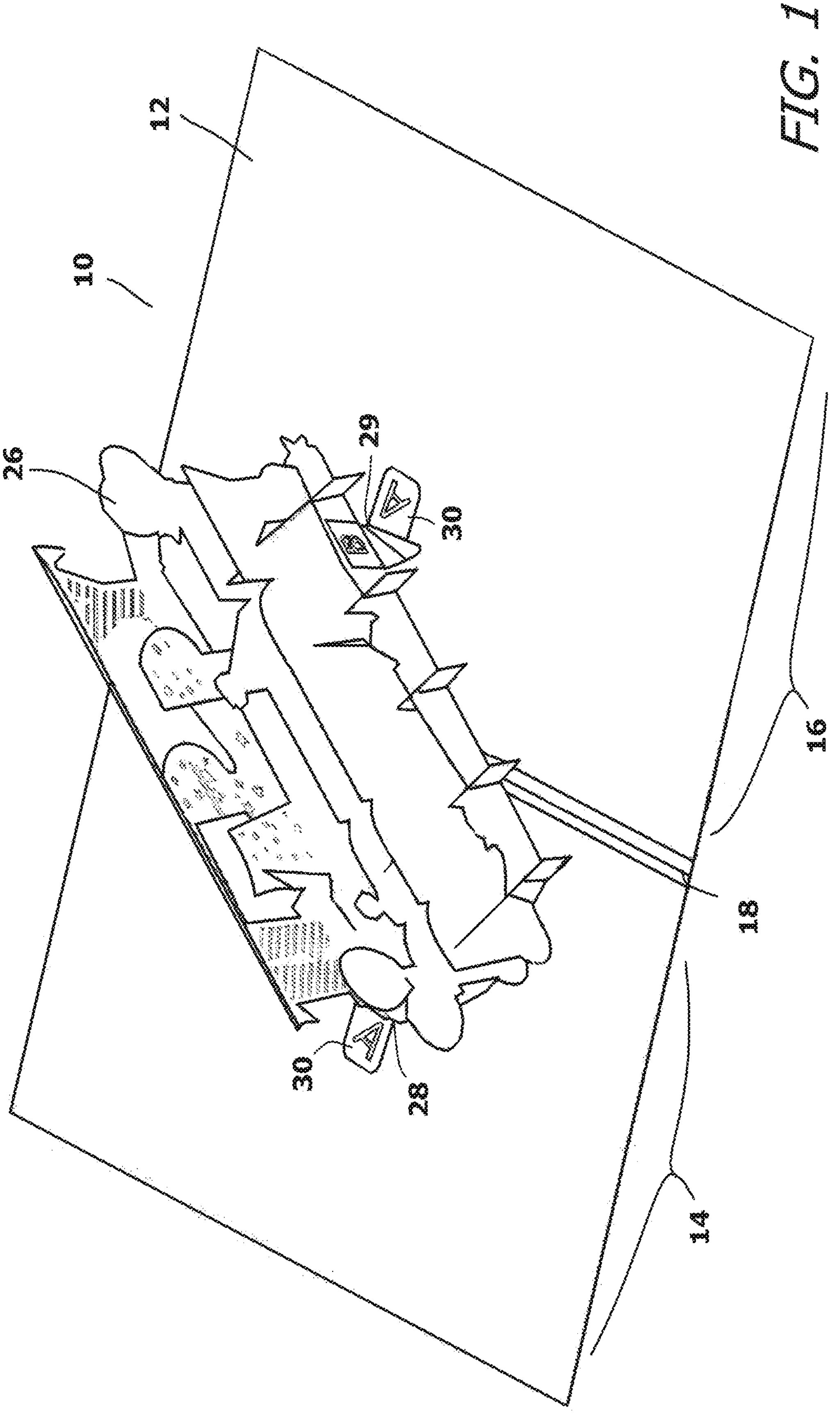
FIG. 1 shows an exemplary embodiment of a 3D pop-up card from an oblique top view.
Figure 2:
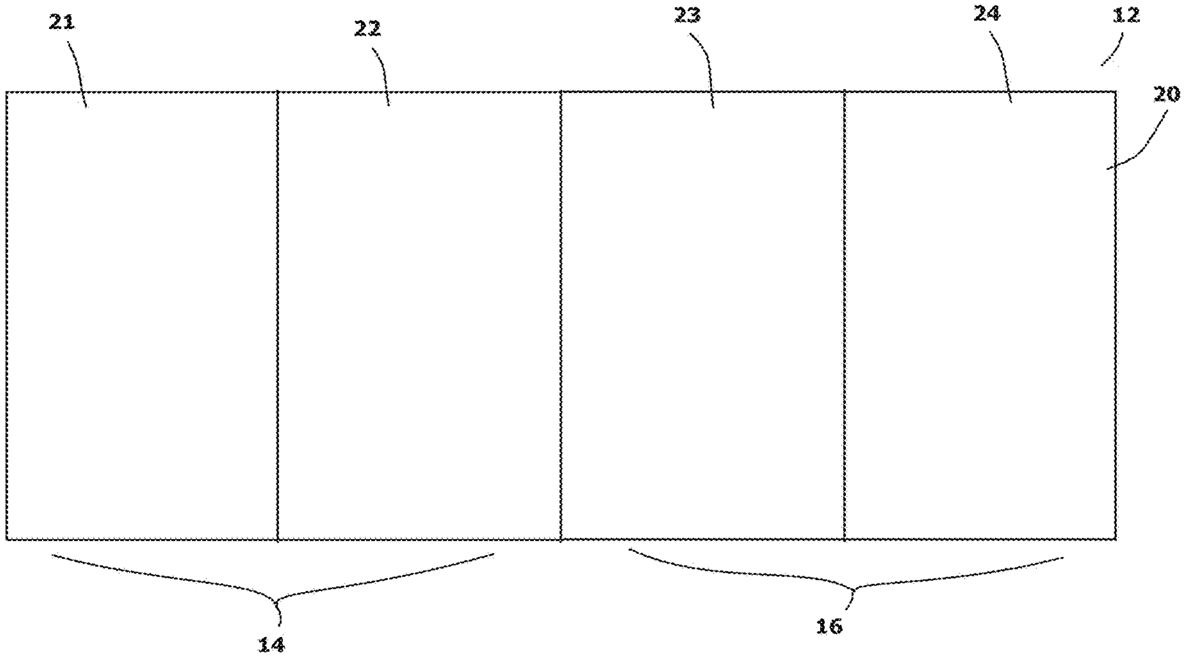
FIG. 2 shows the base card before folding.
Figure 3:
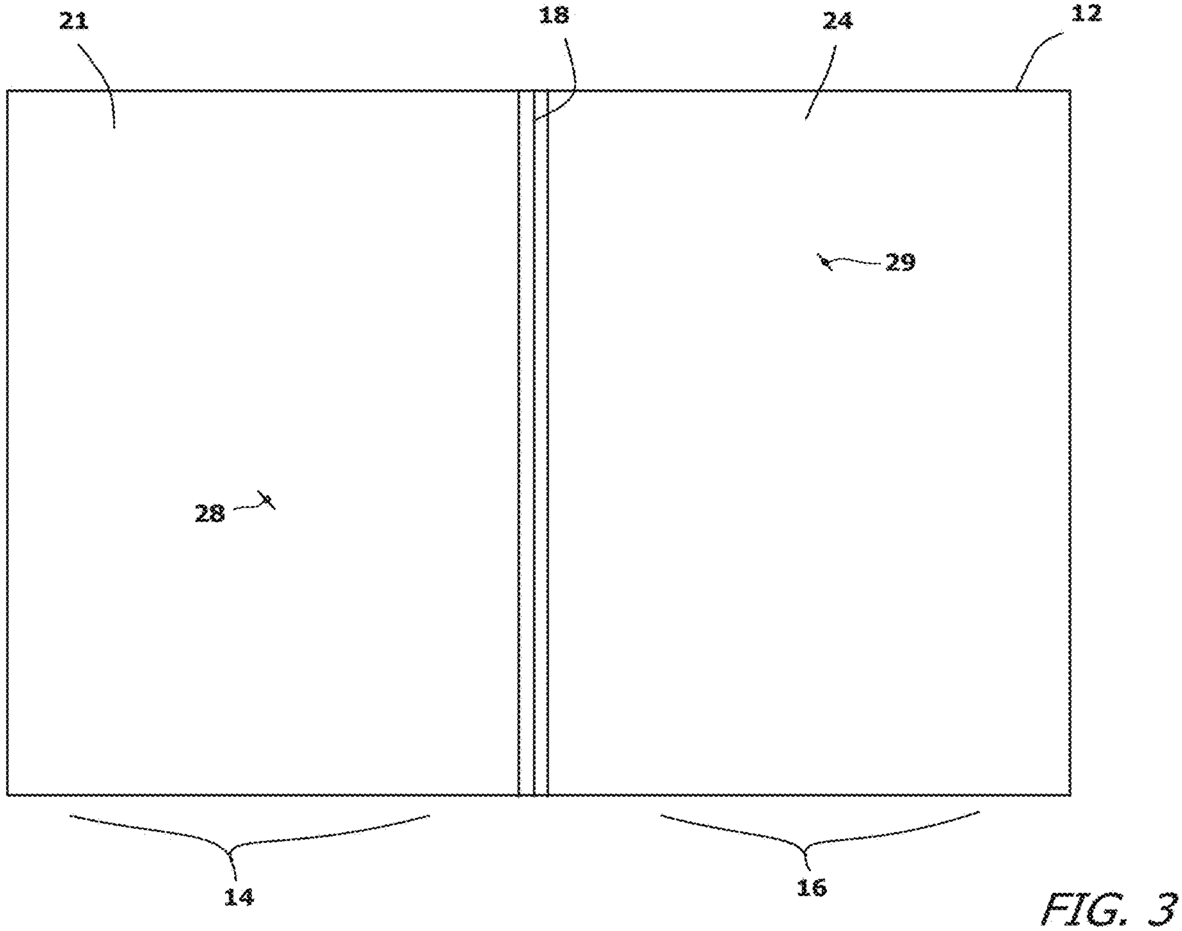
FIG. 3 shows the base card after folding.

Referring to FIG. 1 in conjunction with FIG. 2 and FIG. 3, a 3D pop-up card assembly 10 is shown. The pop-up card assembly 10 includes a base card 12. The base card 12 contains a first panel 14 and a second panel 16 that are joined by a common folding joint 18. The folding joint 18 enables the first panel 14 to fold atop the second panel 16 in a closed configuration so that the first panel 14 and the second panel 16 are both vertically aligned and parallel. In an open configuration, the first panel 14 folds away from the second panel 16 until the first panel 14 and the second panel 16 are coplanar.

The first panel 14 of the base card 12 and the second panel 16 of the base card 12 are both preferably made from a single piece of folded paper stock 20. The first panel 14 and the second panel 16 can be one layer or two layers thick. As is shown in FIG. 2 and FIG. 3, both the first panel 14 and the second panel 16 can be made two layers thick by segmenting the paper stock 20 into four segments 21, 22, 23, 24. The first segment 21 is folded over the second segment 22 to form the first panel 14. The fourth segment 24 is folded over the third segment 23 to form the second panel 16.

A foldable FIG. 26 is attached to the base card 12 in at least two positions. The foldable FIG. 26 can be any pop-up 3D construction that is initially folded flat but forms a three-dimensional form when placed in tension between specific points. Thousands of foldable FIG. 26 have been designed for use in books and cards. Many of these known foldable FIG. 26 can be adapted for use as part of the present invention. In order to make the foldable FIG. 26 unfold into the three-dimensional structure, tension must be applied to the foldable FIG. 26 between a first point 28 and a second point 29. The first point 28 is affixed to the first panel 14 of the base card 12. The second point 29 is affixed to the second panel 16 of the base card 12. When the base card 12 is opened, the first panel 14 rotates away from the second panel 16, therein applying tension between the first point 28 and the second point 29. As a consequence, when the base card 12 is moved from its closed configuration to its open configuration, the foldable FIG. 26 is placed in tension and unfolds into a three-dimensional structure.

Figure 4:
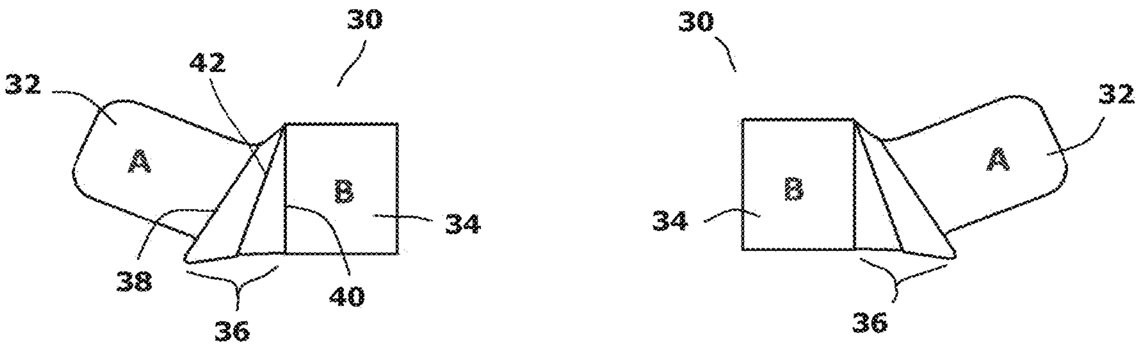
FIG. 4 shows the paper hinge constructs used to connect the foldable figure to the base card.
Figure 5:
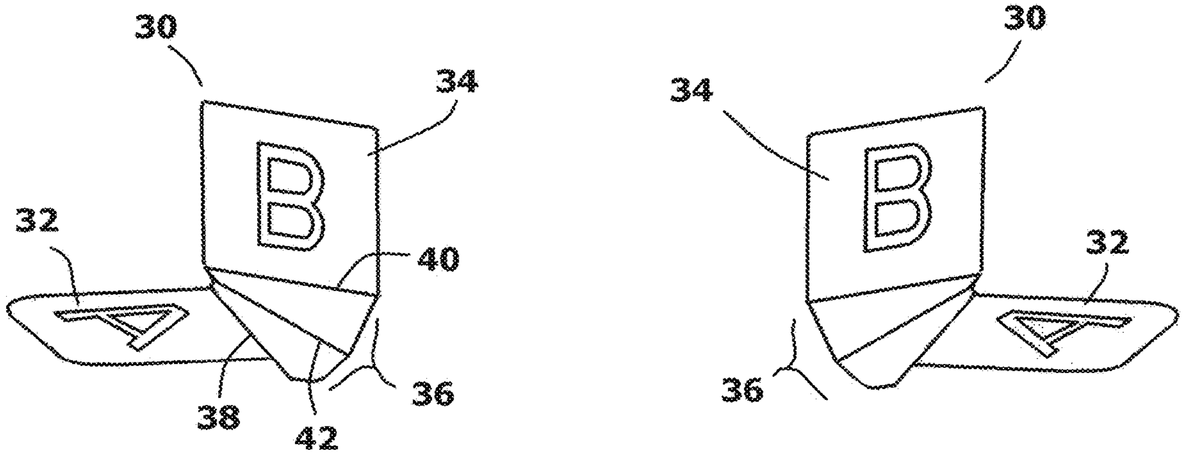
FIG. 5 shows the paper hinge constructs of FIG. 4 at an alternate angle.

Referring to FIG. 4 and FIG. 5 in conjunction with FIG. 1, it can be seen that the foldable FIG. 26 is attached to the base card 12 using paper hinge constructs 30. Each paper hinge construct 30 is a dedicated item that is initially separate and distinct from both the foldable FIG. 26 and the base card 12. Each paper hinge construct 30 is a cut piece of paper that includes a first tab 32, a second tab 34, and a transition section 36 between the first tab 32 and the second tab 34. The transition section 36 is generally triangular and contains a first long edge 38 and a second long edge 40 that diverge away from each other at an acute angle A1. The first tab 32 is generally rectangular and extends away from the first long edge 38 of the transition section 36, wherein the first long edge 38 forms one side of the first tab 32. Likewise, the second tab 34 is generally rectangular and extends away from the second long edge 40 of the transition section 36, wherein the second long edge 40 forms one side of the second tab 34. The paper hinge construct 30 is folded along the first long edge 38 and along the second long edge 40. In addition, there is a central fold 42 in the transition section 36 that bisects the transition section 36 between the first long edge 38 and the second long edge 40. The fold along the first long edge 38, the fold along the second long edge 40 and the central fold 42 all enable each paper hinge construct 30 to repeatedly bend along the folds without tearing.

Figure 6:
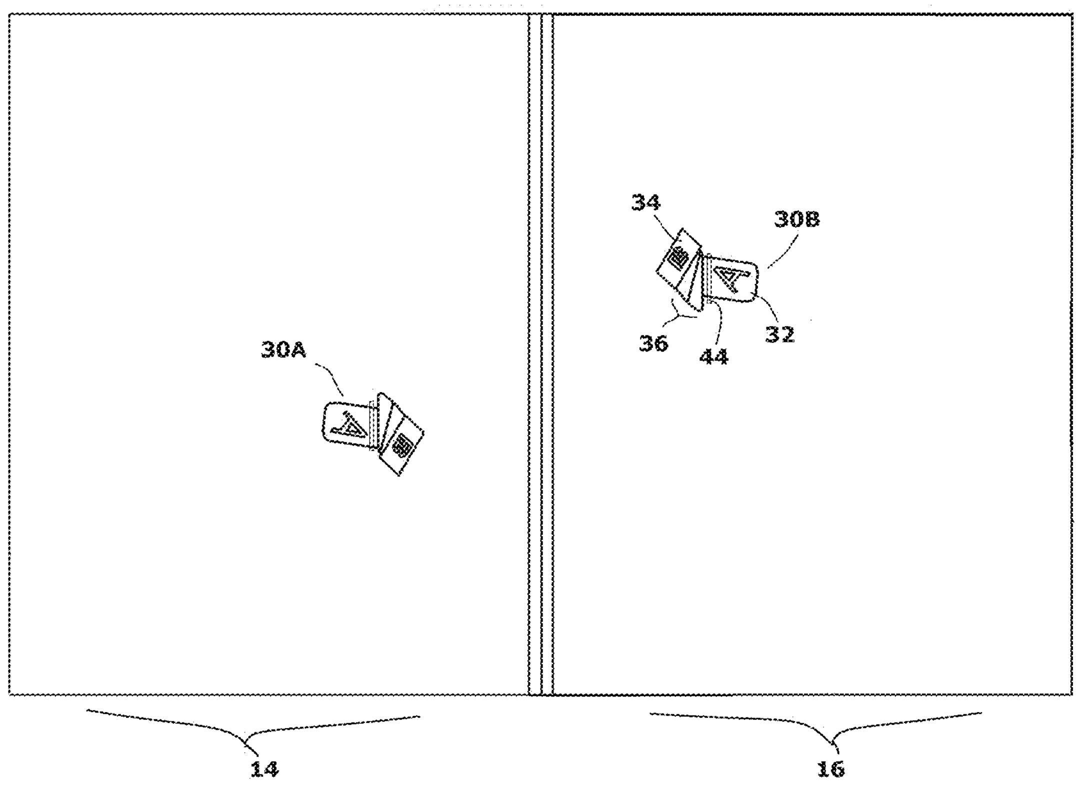
FIG. 6 shows the base card after folding in combination with attached paper hinge constructs.

Referring to FIG. 6 in conjunction with FIG. 4 and FIG. 1, it can be seen that at least two paper hinge constructs 30 are used to attach the foldable FIG. 26 to the base card 12. A first paper hinge construct 30A attaches the foldable FIG. 26 to the first panel 14 of the base card 12 while a second paper hinge construct 30B attaches the foldable FIG. 26 to the second panel 16 of the base card 12.

The first tab 32 of each paper hinge construct 30 is attached to the base card 12. Each first tab 32 can be glued or otherwise adhered to the base card 12. In the preferred embodiment, each first tab 32 is inserted into a slot 44 that is formed into the base card 12 and is adhered or otherwise anchored in place. In this manner, the first tab 32 of each paper hinge construct 30 cannot be seen. However, if the first tab 32 is colored or otherwise contains graphics that match the interior of the base card 12, then each first tab 32 can be adhered directly to the base card 12 and will not detract from the overall aesthetics of the 3D pop-up card assembly 10.

The second tab 34 of each paper hinge construct 30 is attached to the foldable FIG. 26. Each second tab 34 can be glued or otherwise adhered to the foldable FIG. 26. The position where the first tab 32 attaches to the base card 12 and the position where the second tab 34 attaches to the foldable FIG. 26 are offset from each other. The offset refers to the fact that the first tab 32 is attached to the base card 12 in the plane of the base card 12. The second tab 34 is attached to the foldable FIG. 26. The position of the foldable FIG. 26 changes as the 3D pop-up card assembly 10 opens and closes. When the 3D pop-up card assembly is fully open, and the foldable FIG. 26 is fully deployed, the second tab 34 is both perpendicular to the first tab 32 in one plane and angled to the first plane in a second plane. The offset causes forces to be applied to different portions of the foldable FIG. 26 when unfolded, such as diagonally opposite portions. Accordingly, the foldable FIG. 26 can be pulled apart diagonally and expanded.

The ability of the paper hinge constructs 30 to fold at complex angles is provided by the three folds within the triangular transition section 36. The fold lines are not parallel and act as pleats to enable the second tab 34 to both bend and turn away from the first tab 32 as the base card 12 is opened.

Figure 7:
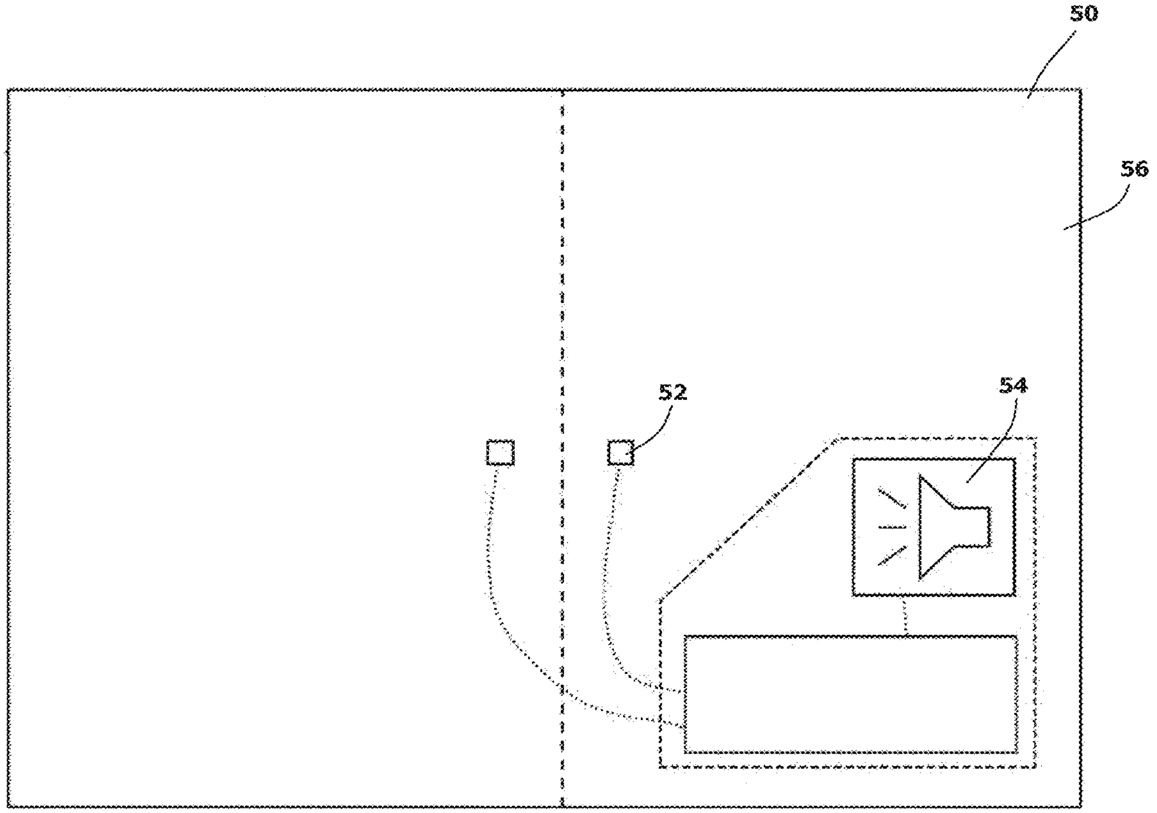
FIG. 7 shows an alternate embodiment of the base card with electronic components.

Referring to FIG. 7, an alternate embodiment of a 3D pop-up card assembly 50 is shown having light 52 and/or acoustic elements 54 and a switch for activating the light 52 and/or acoustic elements 54. The light 52 and/or acoustic elements 54 provide additional visual or acoustic effects, for example by playing a song adapted to the occasion of the gifting of the card, such as "Happy Birthday" or Christmas songs. Light effects can be produced using LEDs.

The light 52 and/or acoustic elements 54 can be arranged between the layers of a base card 56. If these are only glued together in the edge area, an intermediate space remains which is well suited for accommodating additional elements. The corresponding elements are thus largely invisible from the outside but can nevertheless fulfill their purpose. In the case of light elements 52, however, it should be noted that, in order to achieve the desired effects, these must be visible from the outside, for example by attaching LEDs to the outside or by having corresponding recesses in the base card 56.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A 3D pop-up card assembly, comprising:

a base card having a first panel and a second panel joined at a common folding joint;

a foldable figure having a folded flat condition and an unfolded three-dimensional condition; and a plurality of paper hinge constructs that connect said foldable figure to said base card, wherein each of said plurality of paper hinge constructs has a first tab, a second tab and a transition section interposed between said first tab and said second tab, wherein said transition section contains fold lines along which each of said plurality of paper hinge constructs can fold;

wherein said first tab of each of said plurality of paper hinge constructs is attached to said base card and said second tab of each of said plurality of paper hinge constructs is attached to said foldable figure, therein connecting said foldable figure to said base card.

2. The 3D pop-up card assembly according to claim 1, wherein said fold lines are not parallel.

3. The 3D pop-up card assembly according to claim 1, wherein said fold lines include a first fold between said first tab and said transition section and a second fold between said second tab and said transition section.

4. The 3D pop-up card assembly according to claim 2, further including a third fold in said transition section disposed between said first fold and said second fold.

5. The 3D pop-up card assembly according to claim 1, wherein said transition section is triangular in shape.

6. The 3D pop-up card assembly according to claim 1, wherein each of said plurality of paper hinge constructs is separate and distinct from said base card and said foldable figure until said first tab is attached to said base card and said second tab is attached to said foldable figure.

7. The 3D pop-up card assembly according to claim 1, wherein said plurality of paper hinge constructs includes a first paper hinge construct that attaches said foldable figure to said first panel of said base card and a second paper hinge construct that attaches said foldable figure to said second panel of said base card.

8. The 3D pop-up card assembly according to claim 1, wherein said first tab and said second tab on each of said plurality of paper hinge constructs intersect said transition section at dissimilar angles.

* * * * *